J. P. STOEFFLER & F. STRUB.
Corn-Planter.

No. 218,078. Patented July 29, 1879.

Witnesses:
Fred. G. Dieterich
J. R. Littell

Inventors:
John P. Stoeffler
and Frank Strub,
By C. A. Snow & Co.
Attys

N. PETERS, PHOTO-LITHOGRAPHER, WASHINGTON, D C.

J. P. STOEFFLER & F. STRUB.
Corn-Planter.

No. 218,078. Patented July 29, 1879.

Fig. 2.

Witnesses:
Fred G. Dieterich
J. R. Littell

Inventors:
John P. Stoeffler,
and Frank Strub,
by C. A. Snow & Co.
Attys.

N. PETERS, PHOTO-LITHOGRAPHER, WASHINGTON, D C.

J. P. STOEFFLER & F. STRUB.
Corn-Planter.

No. 218,078. Patented July 29, 1879.

Fig. 3.

Witnesses:
Fred G. Dieterich
J. R. Littell

Inventors:
John P. Stoeffler
and Frank Strub
by C. A. Snow & Co.
Attys.

J. P. STOEFFLER & F. STRUB.
Corn-Planter.

No. 218,078. Patented July 29, 1879.

Witnesses:
Fred G. Dieterich
J. R. Littell

Inventors,
John P. Stoeffler
and Frank Strub,
By C. A. Snow & Co.
Atty's

J. P. STOEFFLER & F. STRUB.
Corn-Planter.

No. 218,078. Patented July 29, 1879.

Fig. 5.

Witnesses:
Fred G. Dieterich
J. R. Littell

Inventors:
John P. Stoeffler
and Frank Strub,
by C. A. Snow & Co.
Atty's.

J. P. STOEFFLER & F. STRUB.
Corn-Planter.

No. 218,078. Patented July 29, 1879.

Fig. 6.

Witnesses:
Fred. G. Dieterich
J. R. Littell

Inventors:
John P. Stoeffler,
and Frank Strub,
by C. A. Snow & Co.
att'ys 8 Sheets—Sheet 8.

J. P. STOEFFLER & F. STRUB.
Corn-Planter.

No. 218,078. Patented July 29, 1879.

UNITED STATES PATENT OFFICE.

JOHN P. STOEFFLER AND FRANK STRUB, OF CERES, IOWA.

IMPROVEMENT IN CORN-PLANTERS.

Specification forming part of Letters Patent No. 218,078, dated July 29, 1879; application filed January 27, 1879.

*To all whom it may concern:*

Be it known that we, JOHN P. STOEFFLER and FRANK STRUB, of Ceres, in the county of Clayton and State of Iowa, have invented certain new and useful Improvements in Corn-Planters; and we do hereby declare that the following is a full, clear, and exact description of the invention, which will enable others skilled in the art to which it appertains to make and use the same, reference being had to the accompanying drawings, which form a part of this specification.

Similar letters of reference denote corresponding parts in all the figures.

Figure 1:
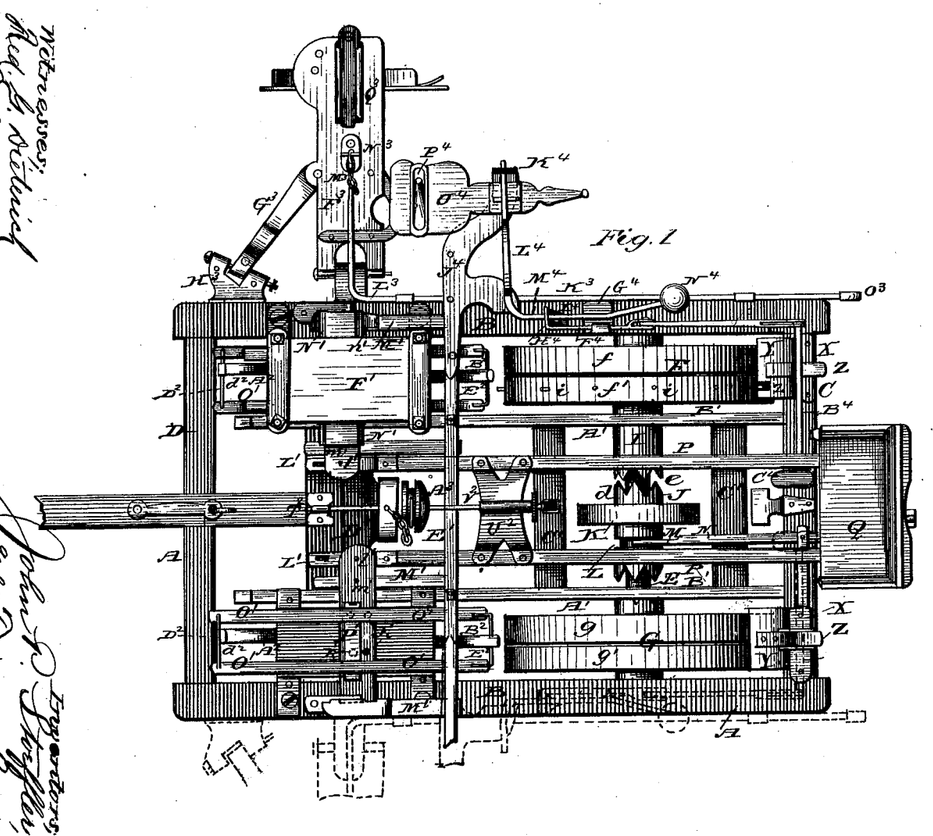
Fig. 1 is a plan view.
Figure 2:
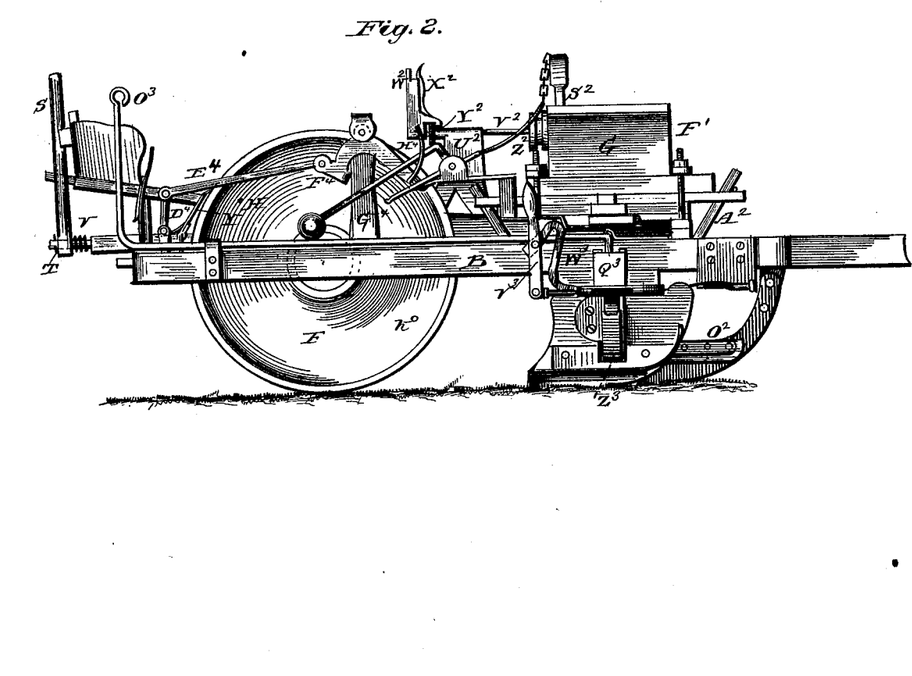
Fig. 2 is a side view.
Figure 3:
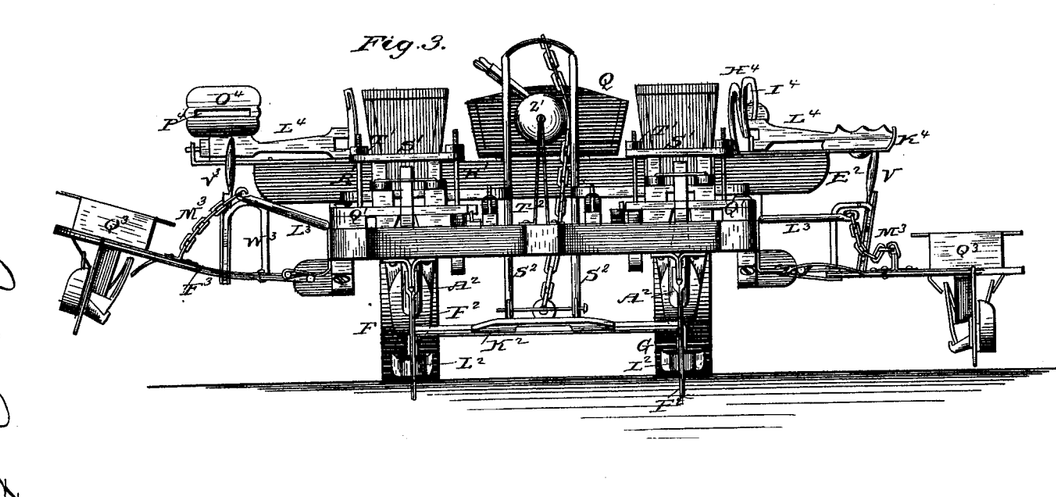
Fig. 3 is a front view.
Figure 4:
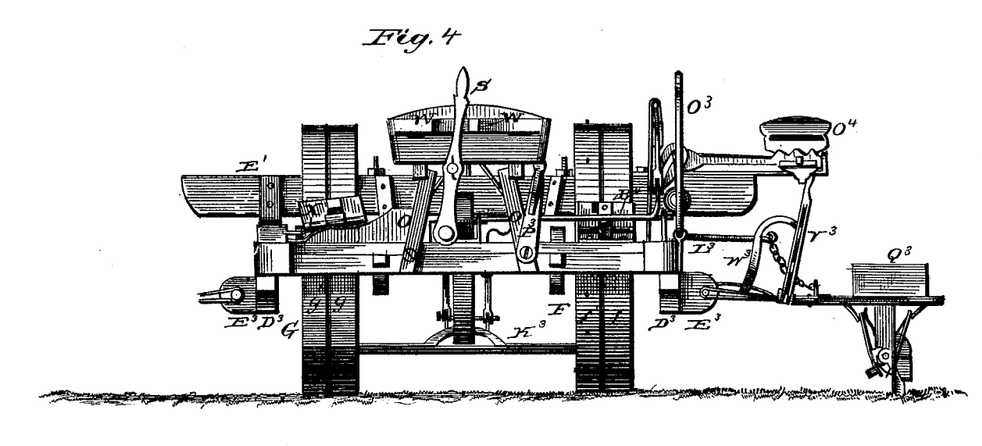
Fig. 4 is a rear view.
Figure 5:
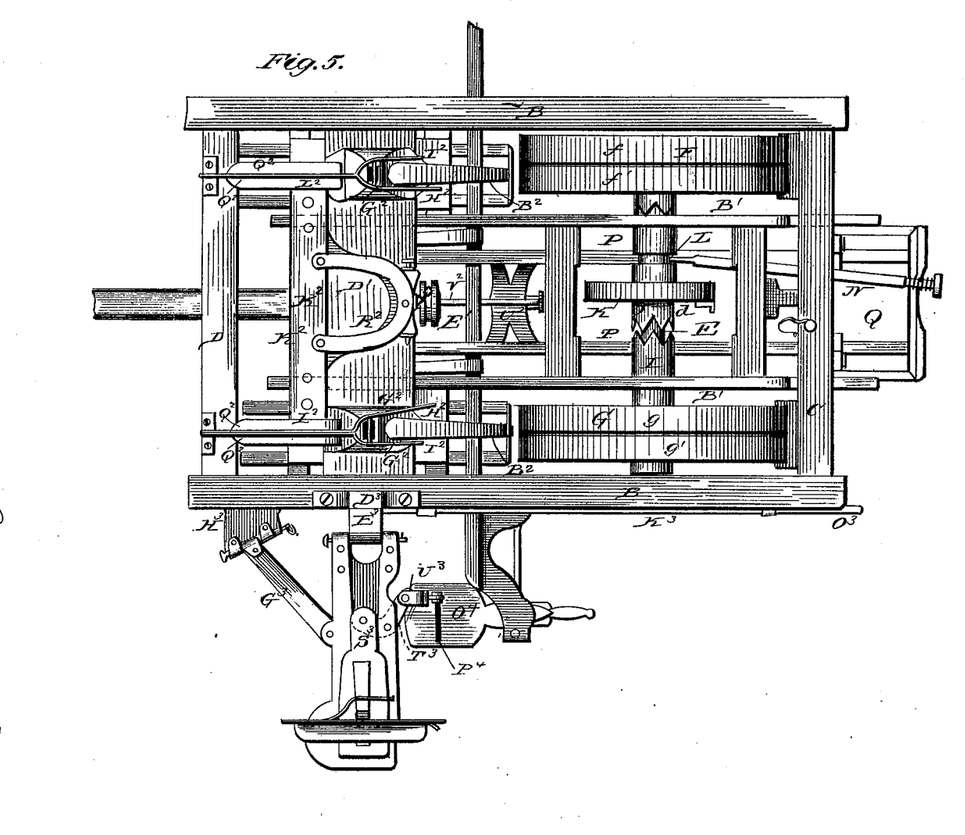
Fig. 5 is a bottom plan.
Figure 6:
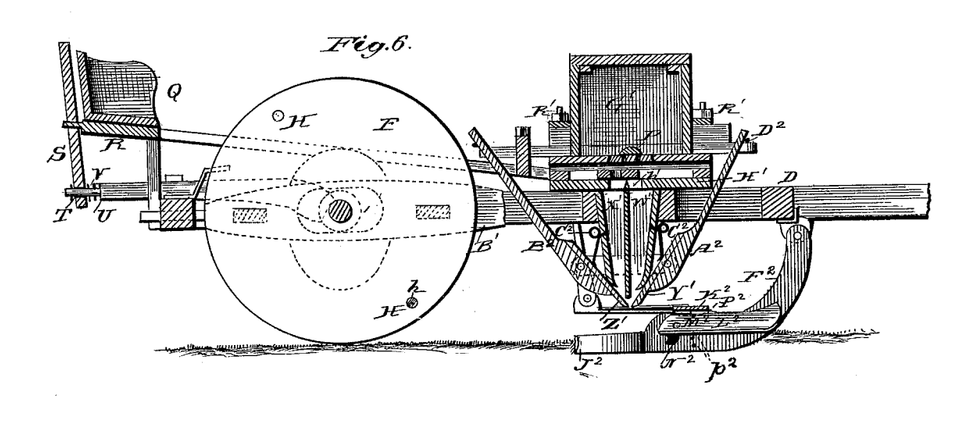
Fig. 6 is a longitudinal section taken through one of the seed-boxes.
Figure 7:
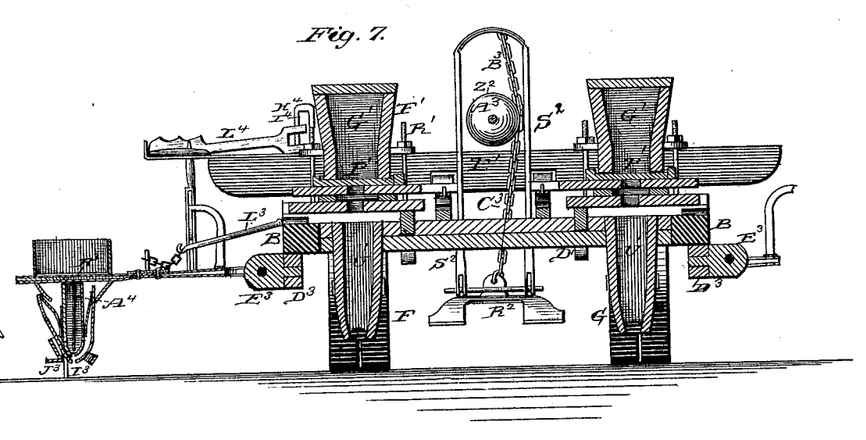
Fig. 7 is a cross-section taken through the seed-boxes.
Figure 8:
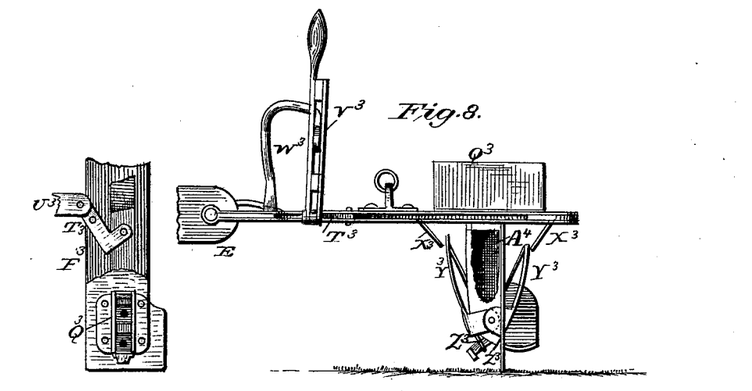
Fig. 8 is a detail view of one of the hinged side markers.
Figure 9:
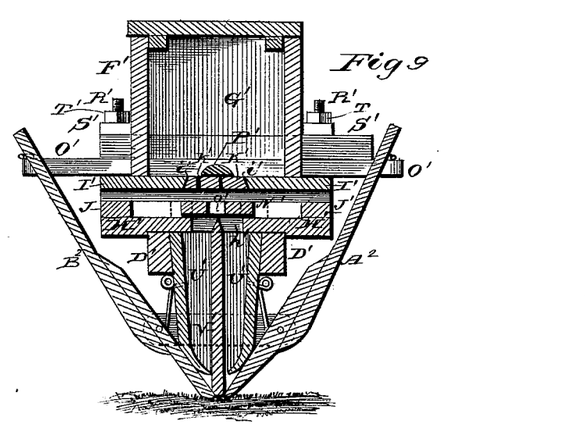
Fig. 9 is a detail view, on an enlarged scale, of a seed-box with its spout and dropping mechanism.

This invention relates to certain improvements in corn-planters, the nature of which improvements will be hereinafter more fully described, and particularly pointed out in the claims.

In the drawings hereto annexed, A represents the frame of the machine, which consists essentially of the side pieces, B B, rear piece, C, and front cross-piece, D. E is the axle, which is secured in the side pieces of the frame as near the rear end of the machine as may be, when allowance is made for the accommodation of the wheels within the frame.

The wheels F G, which are loose upon the axle, each consist of two disks or halves, $f$ $f'$ $g$ $g'$, suitably constructed with or without spokes. Each is provided with a perforation, $h$, for the insertion of a pin, H, by which the disks or halves may be coupled together when desired; and it should be noticed that, although by such coupling device (or its equivalent) the halves may be brought closely together, so as to form the equivalent of solid wheels, yet when the halves are disconnected there should be a slight space—say, from an eighth to a fourth of an inch—between them. The object of this will be hereinafter set forth.

The driving-wheel of the machine is formed by the inner disk, $f'$, of the wheel F. It is provided with radial pins $i$ $i$, inserted into the periphery of the disk about six inches apart, to catch in the ground and force the wheel to revolve. The disk is provided with an inwardly-projecting sleeve, I, encircling the axle, and provided at its inner end with teeth $e$ $e$, which may be made to engage by mechanism, to be hereinafter described, with similar teeth $d$ $d$ upon a sleeve, J, sliding upon the axle and bearing an eccentric or cam, K.

The sleeve J is provided with a circumferential groove, L, for the forked end M of a lever, N, which latter is pivoted upon the rear frame-piece, C. The latter has two uprights, O O, supporting the seat-bars P P, carrying the driver's seat Q. To a bracket, R, projecting from below the latter is pivoted a hand-lever, S, having at its lower end an eye, T, fitting over the end of lever N, where it is held in place by a pin.

The end of lever N is shouldered, as shown at U, and a spring, V, is interposed behind the eye of hand-lever S, so as to give to the latter sufficient elasticity of motion to enable it to be placed and retained in one of the two notches W W upon the rear of the driver's seat.

It will be seen that by operating the hand-lever S, the sleeve J, carrying the cam K, may be slid upon the axle in such a manner as to engage or become disengaged from the drive-wheel of the machine at will of the driver.

Upon the rear frame-piece, C, are arranged two plates, X X, each provided with a hinged scraper, Y, bearing upon the respective wheels, and kept in contact therewith by suitably-arranged springs Z Z. The scraper bearing upon the drive-wheel has a slot, $z$, to admit the pins or drive-teeth with which said wheel is provided.

$A^1$ is a frame consisting of side pieces, $B^1$ $B^1$, connected by cross-pieces $C^1$ $C^1$. Side pieces $B^1$ are slotted and fitted over the axle of the machine in such a manner as to enable the frame to slide freely backward and forward. Bearings are provided in the rear frame-piece, C, of the machine for the rear ends of the side pieces of frame $A^1$, the forward ends of which are supported upon a cross-piece, $D^1$, of the seeder-frame. The cross-pieces $C^1$, by which the side pieces of frame $A^1$ are connected, are arranged, respectively, in front and in rear of the cam K, by the rotation of which a reciprocating forward-and-backward sliding motion is thus imparted to the frame $A^1$. The frame $A^1$ carries a cross-piece, $E^1$, which, of course, reciprocates with it. $F^1$ $F^1$ are the seed-boxes, which are arranged upon the cross-piece $D^1$ of the seeder-frame a distance apart (from center to center) equal to one-half the periphery of the driving-wheel.

The seed-boxes consist of the hoppers $G^1$ $G^1$, having double bottoms $H^1$ $I^1$, arranged upon the cross-piece $D^1$, the lower bottom, $H^1$, being separated from the upper one by blocks $J^1$. The bottom $I^1$ has an opening, $i'$, the sides of which are dovetailed, forming a recess, in which fits a slide, $K^1$, having on each side a row of perforations, $k'$, which form the seed-cups.

It will be observed that the slide $K^1$ is arranged transversely in the seed-box, and that the openings $k'$, from end to end, increase in size, while those opposite each other are of equal size. The slide $K^1$ is held in place by a spring, $L^1$, attached to the forward end of the seat-bar on each side, said spring being provided with an upwardly-projecting pin, $l'$, engaging one of a series of perforations, $m'$, in the slide, the perforations $m'$ being so arranged that but two seed-cups of equal size are exposed at a time in the bottom of the hopper. The lower bottom, $H^1$, has an opening, $h'$, directly above the seed-tube, the construction of which will be hereinafter described.

The cross-piece $E^1$ of the reciprocating frame is provided with forwardly-projecting brackets $M^1$, having studs $n'$, confining and holding what we term the "sliding bottoms" $N^1$, which slide or reciprocate longitudinally between the bottoms $H^1$ $I^1$. The cross-piece $E^1$ is also provided with rods or bracket arms $O^1$, which project forwardly on the sides of each seed-box. The brackets $O^1$ carry cross-pieces $P^1$, by which they are united under the hopper of each seed-box, so that the cross-pieces $P^1$ form slides, which reciprocate longitudinally in the seed-boxes, covering alternately the forward and the rearward of the set of seed-cups which at the time are exposed.

The sliding bottoms $N^1$ have openings $o'$, so disposed as to come directly under the valve-slides $P^1$, carried by the arms $O^1$, as described.

To secure the parts of the seed-boxes properly together, we provide brackets $Q^1$, suitably arranged, and having upwardly-projecting threaded rods or bolts $R^1$. The hoppers, too, are provided with brackets $S^1$, having perforations that fit over the bolts $R^1$. Nuts $T^1$ are then adjusted to keep the parts together.

It is obvious that the various parts are so constructed as not to interfere with the free reciprocating movement of the sliding bottoms and the valve-slides.

The seeding-tubes $U^1$ project downwardly from the bottom of the seed-boxes. Each is divided by a transverse wall, $V^1$, into a forward and a rearward compartment, $W^1$ $X^1$, both of which are open at their upper ends and communicate with the opening $h'$ in the lower bottom, $H^1$, of the seed-box. The seeding-tubes are cut off obliquely at their lower ends, as shown, and each of the compartments is provided with a hinged cover or door, $Y^1$ $Z^1$, having an upwardly-projecting handle, $A^2$ $B^2$, between which and the tube $U^1$ a spring, $C^2$, is interposed to force the handle in an outward direction, and thus keep the door automatically closed. The brackets $O^1$, which are secured to the cross-piece $E^1$ of the reciprocating frame $A^1$, have at their forward ends connecting-pieces $D^2$, thus forming bails $d^2$, within which the handles $A^2$ of the doors of the forward compartments of the seed-tubes are confined, as shown, on each side of the machine. The handles $B^2$ are similarly confined within bails $E^2$, formed by rearward extensions of the arms or brackets $O^1$.

The operation of the seed-dropping mechanism is as follows: As the valve-slide $P^1$ in each seed-box reciprocates it covers, alternately, the front and the rear one of the set of seed-cups which are at the time exposed. The bottom of the one which is uncovered is formed by the solid portion of the sliding bottom $N^1$, the opening in which, $o'$, being directly under the valve-slide, is at the time disposed under the covered seed-cup. The seed from the hopper of course enters the uncovered seed-cups. As the machine moves forward the reciprocating frame $A^1$, with its attachments, is operated, thus reciprocating or changing the position of the valve-slide and the sliding bottom. The effect of this is as follows: The valve-slide cuts off the supply from the seed-cup which has been filled with seed, and the latter drops from the cup through the opening $o'$ in the sliding bottom $N^1$, through the opening $h'$ in the bottom $H^1$, and into the compartment of the seed-tube above which the seed-cup is disposed, and which, for the sake of illustration, we will suppose to be the rear one, $X^1$. Here it remains, resting upon the door or cover $Z^1$, which is at the time closed. In the meantime the forward seed-cup, being uncovered, has been filled with seed, which now, by the forward movement of the frame $A^1$, with its attachments, drops through the openings $o'$ $h'$ into the forward compartment, $W^1$, of the seed-tube, where it rests upon the door $Y^1$; but, by the same forward movement of the sliding frame, the bail $E^2$, confining the handle $B^2$ of the door of the rear compartment, $X^1$, of the seed-tube, strikes against the said handle, forcing it inward toward the seed-box, thus opening the door $Z^1$, and causing the seed resting thereon to drop. When the frame $A^1$ next moves, this time in a rearward direction, the seed is discharged from the rear seed-cup into the compartment $X^1$ of the seed-spout, while at the same time the front seed-cup is uncovered to receive a new supply, and the seed is discharged upon the ground from the front compartment, $W^1$, of the seed-spout, the door $Y^1$ of which is opened by its handle or lever $A^2$ being struck by the bail $d^2$, by which it is confined.

The construction of the seed box it will be observed is such that the quantity of grain sown in each hill may be easily and quickly regulated by simply adjusting the slide $K^1$.

In the event of injury to any part of the seed-box the slide $K^1$ and bottom $H^1$ may be readily removed, thus giving access to the interior of the box.

The boxes being placed apart (from center to center) a distance exactly equal to one-half the periphery of the driving-wheel, the corn will be planted in regular squares, because, as hereinbefore shown, the sliding frame A, operating the seeding mechanism, reciprocates but once (forward and back) with each revolution of the driving-wheel. Regularity in planting is further insured by the fact that the seed does not drop from the hopper directly to the ground, but rests upon the hinged cover at the bottom of the seed-spout, from which the distance to the surface of the ground is so inconsiderable that when the grain is dropped, as hereinbefore described, it can neither become scattered nor be carried forward beyond the place when it should be deposited by the motion of the machine.

To make the furrow or opening in the ground for the seed, I employ the colters $F^2$, which are hinged to the front beam, D, of the frame A, in front of each seed-box, as shown. The colters, which are suitably curved, project downwardly and rearwardly, and terminate under the seed-spouts in forks $G^2$.

It will be noticed that the inner prong or side, $H^2$, of each fork is longer than the outside one, and that both sides, $H^2$ $I^2$, have, at their rear ends, curved or concave recesses $J^2$, the object of all of which will be hereinafter explained.

The colters are connected by a cross-bar, $K^2$, the ends of which form clamps $L^2$, that embrace the colters, as shown, and project forwardly some distance, the colters being pivoted in the clamps $L^2$, at the front ends of the latter. Farther back the clamps are connected by a rivet or stud, $M^2$, working in a segmental slot, $N^2$, in the colter. A flat spring, $O^2$, provided with a tooth, $P^2$, is secured on the outside of each clamp, the said tooth passing through a perforation in the side of the clamp and engaging one of a series of perforations, $p^2$ $p^2$, in the colter, which may thus be raised or lowered, and secured in any desired position in relation to the clamp. The lower edges of the latter are bent outwardly to both sides, as shown at $Q^2$ $Q^2$, thus forming what we term the "sled," which drags upon the ground, and prevents the colter from sinking in the ground and making the furrow any deeper than desired.

The cross-bar $K^2$ has, at the center thereof, a rearwardly-projecting bracket, $R^2$, to which is hinged or otherwise suitably secured an upwardly-projecting bail, $S^2$, reaching up some distance above the cross-piece $D^1$ of the seeder-frame. Brackets $T^2$ $U^2$, projecting upwardly, are secured upon the cross-piece $D^1$, and upon the seat-bars P P, as shown. These brackets are provided with boxes or bearings for a longitudinal shaft, $V^2$, carrying at its rear end a lever-handle, $W^2$, provided with a spring-catch, $X^2$, for engagement with a segmental or circular rack, $Y^2$, secured vertically upon the rear bracket, $U^2$. The shaft $V^2$ carries a fixed pulley, $Z^2$, disposed directly between the arms of the bail $S^2$. To the pulley $Z^2$ are attached, by a staple, $A^3$, two chains or cords, one of which, $B^3$, passing upwardly, is secured to the top of the bail, while the other one, $C^3$, passing downwardly, is secured to the rear end of the bracket $R^2$ of cross-bar $K^2$.

It will be observed that, owing to this arrangement, when the shaft $V^2$ is turned in one direction the chain $C^3$ is wound upon the pulley, thus raising the cross-bar $K^2$ with its attachments, and consequently lifting the colters out of the ground, this being necessary in turning or transporting the machine. By turning the shaft in the opposite direction the chain $B^3$ is wound upon the pulley, thus drawing the bail $S^2$, and with it the cross-bar $K^2$ with its attachments, in a downwardly direction, and consequently forcing the colters into the ground, where they are held by locking the shaft $V^2$ by means of the spring-catch and rack above described. The colters may be retained in an elevated position by locking the shaft in the same manner.

It will be seen, therefore, that although the colters are adjustable, and although they are in no way connected to or attached to the seed-spouts, a perfect and positive control is at all times had over them, without depending upon their weight to keep them in the ground.

It will also be observed that the means for operating and controlling them is altogether independent of the means for throwing the machine into or out of gear, and that it may be used at will, independently of the latter, or of any other part of the machine. It may be stated that the shaft $V^2$ should project rearwardly far enough to bring its handle $W^2$ within convenient reach of the driver.

When the colters have been set to make a furrow of the required depth, and the machine passes over the field, the forked ends of the colters widen the furrows directly under the seed-spouts sufficiently to receive the seed as it drops from the latter. It has already been stated that the inner prongs or sides, $H^2$, of the forks $G^2$ of the colters are longer than the outer ones, $I^2$. This is in order to assist in pulverizing the soil, which, owing to this difference in length, will fall back into the furrow first from the outer and then from the inner side, instead of falling simultaneously from both sides. The effect of this is to effectually break or pulverize such lumps as may exist in the soil. It has been further stated that the sides $H^2$ $I^2$ are recessed or concaved vertically at their rear ends, as shown in the drawings. The object of this is to cause the rich and comparatively damp soil from the sides of the furrow to fall immediately on top of the seed-corn, and keep the dry and crusty surface soil back until it falls on top thereof, thus surrounding the seed-corn with good and rich soil only, the advantage of which will be readily appreciated.

The seed is covered and the soil is rolled and compressed about it by the wheels of the machine, which for this purpose are arranged in rear of the seed-boxes and in a line therewith.

The construction of the wheels has already been described, and the fact has also been stated that the halves or sections of which they are composed are a short distance apart. It will therefore be seen that as the machine advances it is only the sides of the furrow that are actually compressed by the wheels, a narrow ridge being left loose in the middle directly above the seed. The result is that the seed, when it sprouts, having but a loose crust to pierce, comes up sooner and more vigorously than would be the case if the entire surface of the soil was firmly rolled or packed. At the same time all the advantages derived from rolling the soil in the usual manner are derived from the use of our machine.

We shall now proceed to describe the construction and operation of the markers, by the use of which we are enabled to plant in check-rows without using the ropes or other contrivances usually employed in order to gain this result, and which are so constructed and arranged as to be fully under control of the driver without making it necessary for him to leave his seat.

To the sides B B of the frame A, directly under the cross-piece $D^1$, we secure blocks $D^3$, having lateral outwardly-projecting brackets $E^3$, to which are hinged the top plates, $F^3$, of the side markers.

Braces $G^3$ are pivoted to the plates $F^3$, and hinged obliquely to brackets $H^3$, secured to the side pieces of the frame A, thus insuring strength and rigidity. The markers $I^3$, which are provided with sleds $J^3$, project downwardly from the outer ends of the plates $F^3$, the distance of each marker from the nearest seed-box being equal to the distance between the two seed-boxes from center to center.

$K^3$ is a shaft journaled longitudinally to the side of frame A, one on each side. At its forward end this shaft has a crank or bracket, $L^3$, connected by a chain, $M^3$, to a staple, $N^3$, on top of the plate $F^3$. At its rear end the shaft is provided with a lever-handle, $O^3$, arranged conveniently to the driver, who, by means of this handle, may operate the shaft in such a manner as to raise the marking device from the ground.

A spring-catch, $P^3$, is provided at the rear end of the machine, with which the lever-handle $O^3$ may be engaged, so as to retain the marking device suspended above the ground.

The marker-plate on each side of the machine is provided with a seed box or hopper, $Q^3$, the dropping mechanism of which is identical with that of the seed-boxes proper, with the exception that the movement of the valve-slide and the sliding bottom is transverse instead of longitudinal with the frame of the machine.

The valve-slide frame $R^3$ and the sliding bottom $S^3$, which are suitably connected, have an arm, $T^3$, connected by a pivoted bar, $U^3$, with an upright lever, $V^3$, pivoted to a bracket, $W^3$. The sliding bottom is provided with downwardly-projecting arms or studs $X^3$, which, by striking the handles $Y^3$ of the hinged doors $Z^3$ of the seed-spout $A^4$, operate the said doors alternately, so as to cause the seed resting thereon to drop. It will be seen that this seeding mechanism is operated by vibrating the lever $V^3$. This is done at will of the driver in the following manner:

Journaled in suitable bearings upon the rear frame-piece, C, of frame A is a shaft, $B^4$, provided with a foot-lever, $C^4$, convenient to the driver, and having at its outer end an upwardly-projecting arm or crank, $D^4$. The latter is connected by a pivoted rod, $E^4$, with a bell-crank lever, $F^4$, fulcrumed upon an upright, $G^4$, upon the side of the seeder-frame. The lever $F^4$ is provided at its front end with a plate, $H^4$, having a vertical slot, $I^4$.

Secured to the end of the cross-bar $E^1$ of the reciprocating frame $A^1$ is a plate, $J^4$, having bearings $K^4$ for a rock-shaft, $L^4$, provided at its inner end with an arm, $M^4$, passing through the slot $I^4$ in plate $H^4$ of the lever $F^4$, and having at its end a weight, $N^4$, counterbalancing a plate, $O^4$, which projects forwardly from the outer end of the rock-shaft. The plate $O^4$ has a transverse slot, $P^4$, arranged directly above the lever $V^3$.

It will thus be seen that if, when the marker is upon the ground, the driver operates the foot-lever $C^4$ the motion is communicated to the plate $O^4$, the slot in which, $P^4$, is fitted over lever $V^3$, and the plate $O^4$ being attached to the reciprocating frame $A^1$ of the seeder, a vibrating motion will be given to lever $V^3$, thus operating the seed-dropping mechanism of the marker simultaneously with that of the machine proper, both being actuated by the sliding frame $A^1$. It will, of course, be understood that one of the markers, with its attachments and operating mechanism, is arranged on each side of the machine.

When the machine is in operation the marker toward the side of the field to be planted is let down, thus marking the next furrow. When the end of the field is approached the seed-dropping mechanism of this marker is put in operation, so as to drop seed simultaneously with the seed-planter proper for the last two or three rows. When the end of the field is reached the dropping mechanism of the marker is thrown out of operation, (this being effected by the driver simply releasing the foot-lever, when the weighted arm $M^4$ will lift the slotted plate $O^4$ out of engagement with lever $V^3$,) the marker is raised or lifted, and the machine is turned, its inner wheel being placed in the furrow made by the marker.

It is obvious that while the machine is being turned its operating or seed-dropping mechanism should be thrown out of action by disengaging the cam-clutch from the clutch upon the drive-wheel. The outside marker (the one toward the side of the field to be planted) is now let down, and the machine is carried forward until the inner seed-tube (the one above the furrow made by the marker) is directly above one of the places where seed was dropped by the marker seed-dropping mechanism. This will be the place for starting the seed-dropping mechanism of the machine proper. By doing so at the right time the hills will be in a perfectly straight line, the reason of which is obvious from the construction of the machine, as hereinbefore described.

It will thus be seen that the seed dropped by the mechanism attached to the marker serves to indicate the correct starting-point at each end of the field.

Our improved seed-planter may be readily manipulated by one man, without his having to leave his seat either to operate any of the attachments or to assist in turning or regulating at the start. It is a perfect check-rower, and corn is planted by it with great regularity and precision. It is, moreover, strong, durable, and easily managed.

Having thus described our invention, we claim and desire to secure by Letters Patent of the United States—

1. In a seed-planter, the transporting and covering wheels, each consisting of two independent vertical disks or sections, arranged upon the axle a short distance from each other, substantially as and for the purpose herein set forth.

2. In a seed-planter, the combined transporting, covering, and driving wheel F, consisting of two independent sections, $f f'$, the inner one of which, $f'$, is provided with radial pins, and with a clutch for engagement with the operating mechanism of the machine, substantially as and for the purpose herein set forth.

3. The seed-box consisting of the following parts—viz., a hopper, a longitudinally-reciprocating valve-slide or covering-slide, an upper bottom having seed-cups alternately covered by said slide, a longitudinally-reciprocating bottom having an opening arranged directly under the reciprocating valve-slide, and a lower bottom having an opening leading to the several compartments of the seed-spout, all combined and arranged substantially as and for the purpose herein shown and specified.

4. The combination of the bottom $I^1$, having transversely-adjustable seed-cup slide, and bottom $H^1$ of the seed-box, both arranged permanently upon the cross-piece $D^1$ of the seeder-frame $A^1$, with the brackets $O^1$, having valve-slide $P^1$, and arms $M^1$, carrying sliding removable bottom $N^1$, both carried by the cross-piece $E^1$ of the reciprocating frame $A^1$, substantially as and for the purpose herein shown and specified.

5. The seed-spout divided transversely and vertically into two compartments having hinged seed-supporting doors or covers operated alternately by the mechanism of the machine, substantially as and for the purpose herein shown and specified.

6. The seed-spout divided transversely and vertically into two compartments having hinged seed-supporting doors or covers provided with handles, between which and the sides of the spout springs are interposed to to keep the doors automatically closed, substantially as described, for the purpose shown and specified.

7. The combination, with the seed-spout divided transversely and vertically into two compartments provided with hinged seed-supporting doors having upwardly-projecting handles, between which and the sides of the spout springs are interposed to keep the doors automatically closed, of the bails $d^2$ $E^2$, extending forwardly and rearwardly from the cross-piece $E^1$ of reciprocating frame $A^1$, and confining the upper ends of the handles of the hinged doors of the seed-spout, which are thus alternately operated by the reciprocating movement of frame $A^1$, substantially as and for the purpose herein shown and specified.

8. The combination, with the cross-bar $K^2$, having bracket $R^2$ and bail $S^2$, projecting upwardly from said bracket, of the longitudinal shaft $V^2$, arranged in bearings upon frame A, and carrying the pulley $Z^2$, connected by chains $B^3$ $C^3$ with the top of bail $S^2$ and the rear end of bracket $R^2$, respectively, said shaft being operated and controlled by a lever, $W^2$, and spring-catch and rack $X^2$ $Y^2$, by means of which the cross-bar $K^2$, with its attachments, may be vertically adjusted to and retained in any desired position, substantially as and for the purpose herein shown and specified.

9. The combination, with a corn-planter, of the hinged side markers having seed-dropping attachments, arranged to be operated simultaneously with and by the same mechanism as the seed-dropping mechanism of the machine proper, substantially as and for the purpose herein set forth.

10. The hinged side markers and seed-droppers, arranged as herein described, in combination with the crank-shaft $K^3$, having handle $O^3$ for elevating said markers, and the spring-catch $P^3$ to keep them suspended, substantially as and for the purpose herein shown and specified.

11. The combination, with the vertical vibrating lever $V^3$, operating the seed-dropping mechanism of the marker, of the transversely-slotted plate $O^4$, which projects forwardly from a rock-shaft, $L^4$, journaled to the cross-piece $E^1$ of the reciprocating seeder-frame $A^1$, and mechanism for operating the said slotted plate to adjust it over or withdraw it from the lever $V^3$, substantially as and for the purpose herein shown and specified.

12. The rock-shaft $L^4$, having weighted arm $M^4$, counterbalancing the slotted plate $O^4$, substantially as and for the purpose herein set forth.

13. The combination, with the crank-shaft $B^4$, having foot-lever $C^4$, connecting-rod $E^4$, and bell-crank lever $F^4$, having slotted plate $H^4$, of the rock-shaft $L^4$, journaled upon the cross piece $E^1$ of reciprocating frame $A^1$, and having slotted plate $O^4$ and weighted arm $M^4$, and the vertical vibrating lever $V^3$, operating the seed-dropping mechanism of the marker, all arranged and operating substantially as and for the purpose herein shown and specified.

In testimony that we claim the foregoing as our own we have hereto affixed our signatures in presence of two witnesses.

JOHN PETER STOEFFLER.
FRANK STRUB.

Witnesses:
JACOB SCHARWARDT,
ANTON STRUB.